(12) United States Patent
Wright et al.

(10) Patent No.: US 7,421,544 B1
(45) Date of Patent: Sep. 2, 2008

(54) FACILITATING CONCURRENT NON-TRANSACTIONAL EXECUTION IN A TRANSACTIONAL MEMORY SYSTEM

(75) Inventors: Gregory M. Wright, Mountain View, CA (US); Michael H. Paleczny, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 289 days.

(21) Appl. No.: 11/098,134

(22) Filed: Apr. 4, 2005

(51) Int. Cl.
*G06F 12/16* (2006.01)
(52) U.S. Cl. .................. 711/150; 711/170; 711/151; 711/152; 718/100; 718/101
(58) Field of Classification Search ......... 718/100–101; 711/170
See application file for complete search history.

(56) References Cited

U.S. PATENT DOCUMENTS 5,414,839 A * 5/1995 Joshi ............................. 707/8
6,272,607 B1 * 8/2001 Baentsch et al. ............ 711/162
6,970,970 B2 * 11/2005 Jung et al. ................... 711/103
2006/0161740 A1 * 7/2006 Kottapalli et al. ........... 711/152

* cited by examiner

*Primary Examiner*—Donald Sparks
*Assistant Examiner*—Alan M Otto
(74) *Attorney, Agent, or Firm*—Park, Vaughan & Fleming LLP; Edward J. Grundler

(57) ABSTRACT

One embodiment of the present invention provides a system that facilitates concurrent non-transactional operations in a transactional memory system. During operation, the system receives a load instruction related to a local transaction. Next, the system determines if an entry for the memory location requested by the load instruction already exists in the transaction buffer. If not, the system allocates an entry for the memory location in the transaction buffer, reads data for the load instruction from the cache, and stores the data in the transaction buffer. Finally, the system returns the data to the processor to complete the load instruction. In this way, if a remote non-transactional store instruction is received during the transaction, the remote non-transactional store proceeds and does not cause the local transaction to abort.

21 Claims, 6 Drawing Sheets

FACILITATING CONCURRENT NON-TRANSACTIONAL EXECUTION IN A TRANSACTIONAL MEMORY SYSTEM

BACKGROUND

1. Field of the Invention

The present invention relates to computer memory systems. More specifically, the present invention relates to a method and an apparatus for facilitating concurrent non-transactional execution in a transactional memory system.

2. Related Art

Computer system designers are presently developing mechanisms to support multi-threading within the latest generation of Chip-Multiprocessors (CMPs) as well as more traditional Shared Memory Multiprocessors (SMPs). With proper hardware support, multi-threading can dramatically increase the performance of numerous applications. However, as microprocessor performance continues to increase, the time spent synchronizing between threads (processes) is becoming a large fraction of overall execution time. In fact, as multi-threaded applications begin to use even more threads, this synchronization overhead becomes the dominant factor in limiting application performance.

From a programmer's perspective, synchronization is generally accomplished through the use of locks. A lock is typically acquired before a thread enters a critical section of code, and is released after the thread exits the critical section. If another thread wants to enter a critical section protected by the same lock, it must acquire the same lock. If it is unable to acquire the lock because a preceding thread has grabbed the lock, the thread must wait until the preceding thread releases the lock. (Note that a lock can be implemented in a number of ways, such as through atomic operations or semaphores.)

Unfortunately, the process of acquiring a lock and the process of releasing a lock are very time-consuming in modern microprocessors. They involve atomic operations, which typically flush the load buffer and store buffer, and can consequently require hundreds, if not thousands, of processor cycles to complete.

One technique to reduce the overhead involved in manipulating locks is to "transactionally" execute a critical section, wherein changes made during the transactional execution are not committed to the architectural state of the processor until the transactional execution completes without encountering an interfering data access from another thread. This technique is described in U.S. Pat. No. 6,862,664, entitled, "Method and Apparatus for Avoiding Locks by Speculatively Executing Critical Sections," by inventors Shailender Chaudhry, Marc Tremblay and Quinn A. Jacobson, issued on 1 Mar. 2005.

Proposed transactional memory systems typically hold in-progress transactional state in a "transaction buffer" alongside a normal level-one (L1) cache. During transactional execution, memory operations which are directed to the L1 cache are intercepted by the transaction buffer. The transaction buffer holds this information until the transaction is committed.

When the transaction is committed, values in the transaction buffer are committed as a group to the cache. This means that if the transaction commits, all involved memory locations are updated. However, if the transaction aborts, all involved memory locations are not updated and hence retain their original value.

Unfortunately, performance problems can arise when a remote process attempts to access one of the memory locations related to the transaction, particularly when the remote process attempts to store new information in one of the memory locations. In response to the attempted access, the transaction is aborted and must be restarted from the beginning. Alternatively, the remote store may be rejected or stalled until the completion of the transaction. Either response can cause performance problems because the work that was accomplished between the start of the transaction and the abort is lost and must be repeated, or else progress of the remote thread is impeded.

Hence, what is needed is a method and an apparatus to facilitate concurrent non-transactional execution in a transactional memory system without the problems described above.

SUMMARY

One embodiment of the present invention provides a system that facilitates concurrent non-transactional operations in a transactional memory system. During operation, the system receives a load instruction related to a local transaction. Next, the system determines if an entry for the memory location requested by the load instruction already exists in the transaction buffer. If not, the system allocates an entry for the memory location in the transaction buffer, reads data from the cache, and stores the data in the transaction buffer. Finally, the system returns the data to the processor to complete the load instruction. In this way, if a remote non-transactional store instruction is received during the transaction, the remote non-transactional store proceeds and does not cause the local transaction to abort. Remote non-transactional operations are described in more detail below.

In a variation of this embodiment, the system receives a store instruction related to the local transaction. In response, the system determines if an entry for the memory location addressed by the store instruction is already located in the transaction buffer. If not, the system allocates an entry in the transaction buffer for the memory location, stores the data from the store instruction in the entry, and sets a local stored flag associated with the entry to indicate that the data was stored into the entry.

In a further variation, the system receives a commit instruction for the local transaction. In response, the system determines if the local stored flag is set and the remote stored flag is clear for each entry in the transaction buffer. If so, the system commits the value in the transaction buffer entry to the cache for each entry where the local stored flag is set and the remote stored flag is clear.

In a further variation, upon receiving a remote load instruction related to a remote operation, the system returns data for the remote load instruction from the cache.

In a further variation, upon receiving a remote store instruction related to a remote operation, the system stores data for the remote store instruction into the cache, and, if an entry exists in the transaction buffer for the memory location addressed by the remote store instruction, sets the remote stored flag on that entry.

In a further variation, the local value in the transaction buffer is always a valid value as seen by the local transaction.

In a further variation, a concurrent remote load instruction is serialized before the local transaction, if no concurrent remote store to the same memory location has been serialized after the local transaction; a concurrent remote store instruction is serialized after the local transaction; and a concurrent remote load instruction is serialized after a remote store instruction to the same memory location, if such a remote store instruction has been serialized after the local transaction.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Processor System

Figure 1:
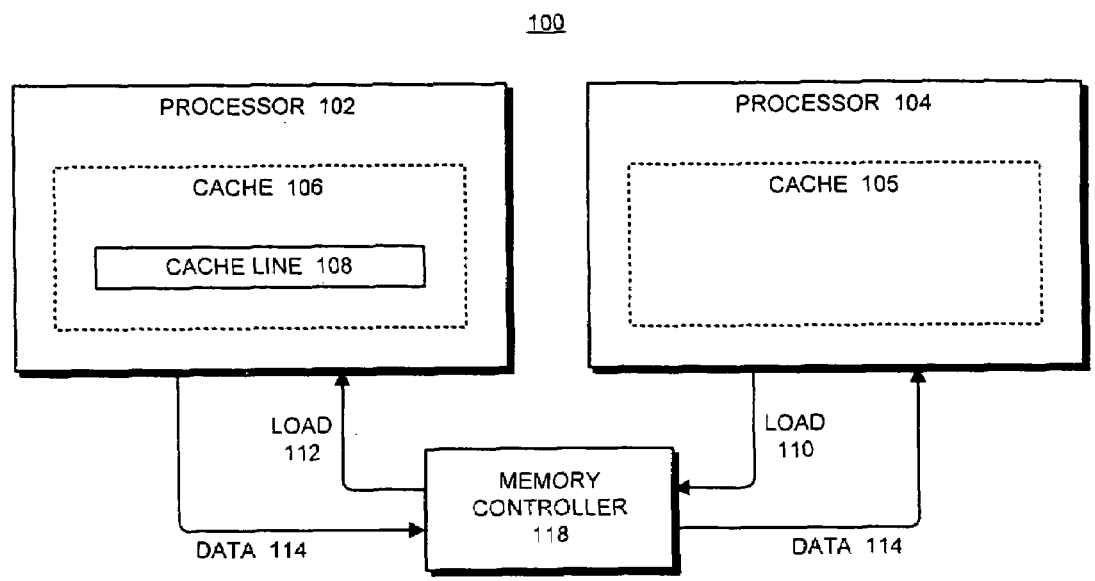
FIG. 1 illustrates a processor system in accordance with an embodiment of the present invention.

FIG. 1 illustrates a processor system 100 in accordance with an embodiment of the present invention. Processor system 100 includes processors 102 and 104 and memory controller 118. Processor 102 includes cache 106 which, in turn, includes cache line 108. Cache line 108 may be involved in a transaction as described further in conjunction with FIG. 2. Similarly, processor 104 includes cache 105.

During operation, processor 104 may generate a load 110 to retrieve data from a memory location that is currently stored in cache line 108 in cache 106. Upon receiving load 110, memory controller 118 recognizes that the current value for the associated memory location is stored in cache line 108 and sends a remote load request 112 to processor 102. In response, processor 102 provides data 114 to memory controller 118. Memory controller 118, in turn, returns data 114 to processor 104.

Transaction Buffer

Figure 2:
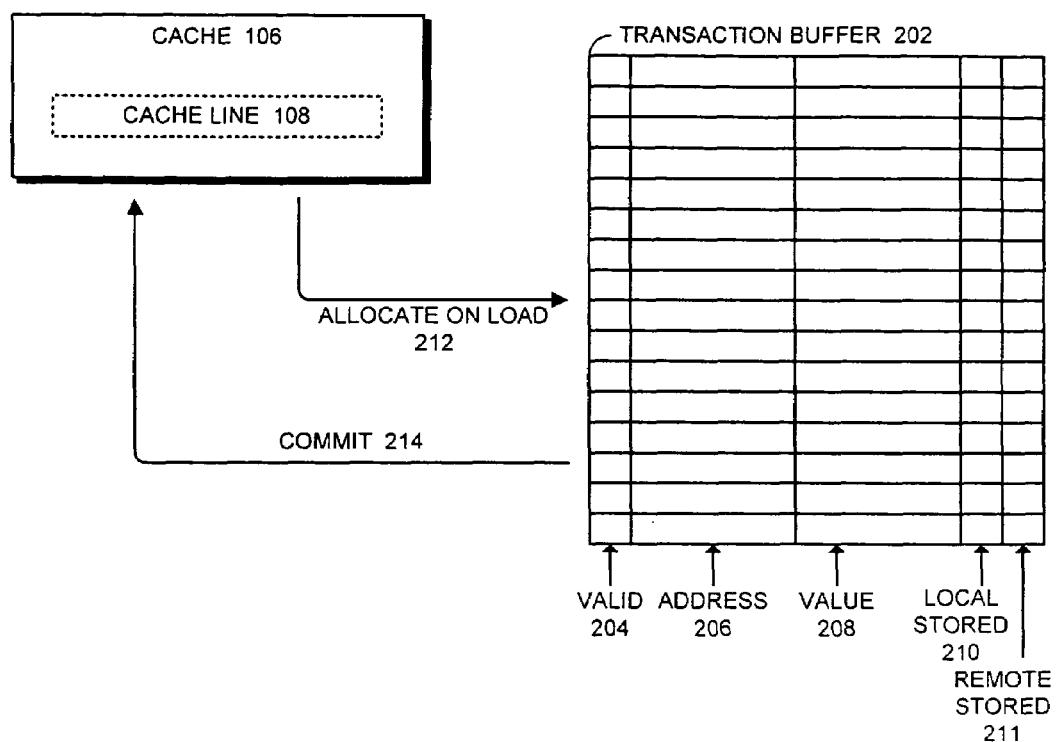
FIG. 2 illustrates a transaction buffer in accordance with an embodiment of the present invention.

FIG. 2 illustrates a transaction buffer 202 in accordance with an embodiment of the present invention. Transaction buffer 202 is initialized at the start of a transaction and maintains the current value for each accessed memory location until the transaction is committed.

During the transaction, each cache location that is referenced is allocated an entry 212 in transaction buffer 202. For example, if cache line 108 is referenced by a load associated with the transaction, an entry is allocated for the addressed location in transaction buffer 202. The address for the location is stored in address field 206 of the allocated entry and the associated data is stored in value field 208 of the allocated entry. Stored bits 210 and 211 are cleared to indicate that neither the local transaction nor a remote store has changed the value in the location.

When the transaction is committed, each entry that has been updated by the transaction is committed 214 to cache 106. This commit process is described in detail below in conjunction with FIG. 7

Local Transactional Load Instruction

Figure 3:
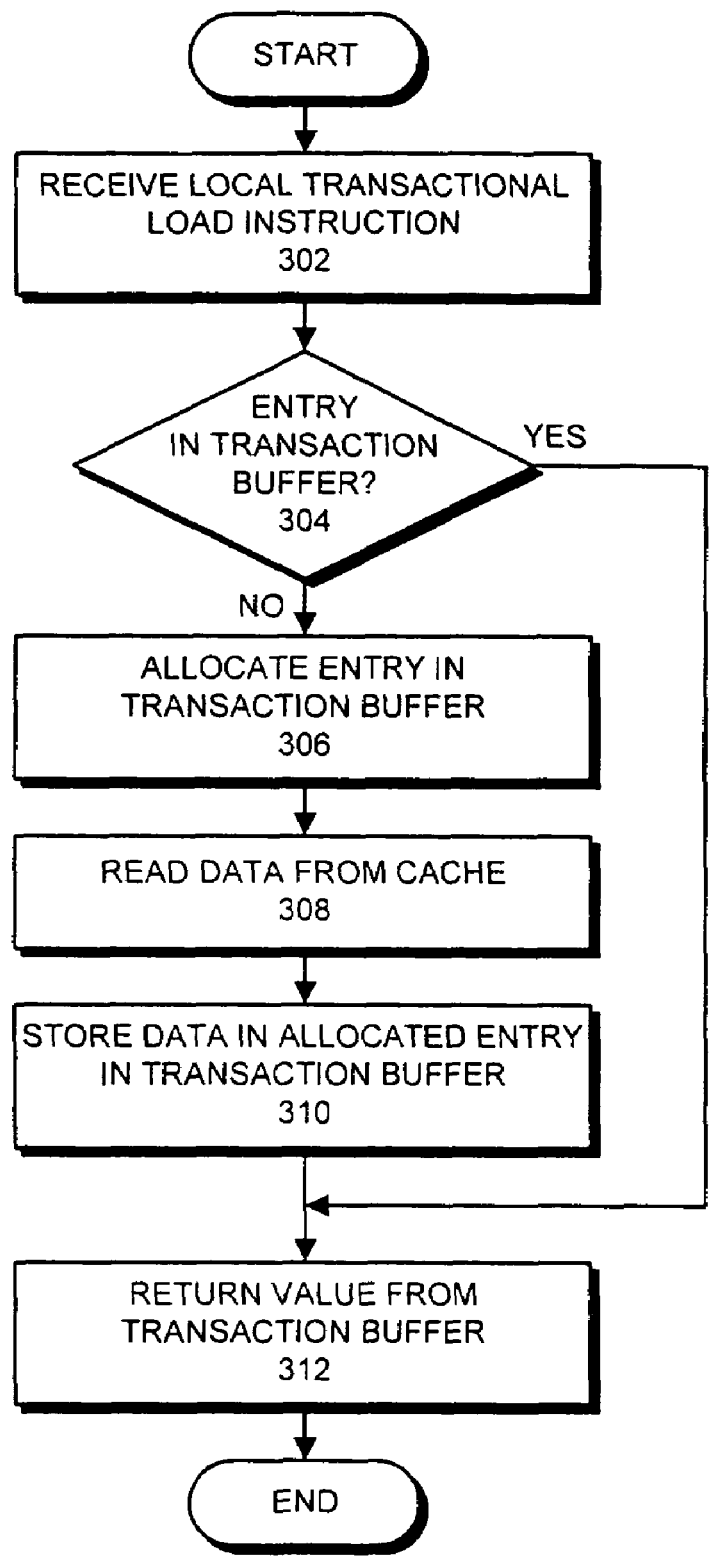
FIG. 3 presents a flowchart illustrating the process of responding to a local transactional load instruction in accordance with an embodiment of the present invention.

FIG. 3 presents a flowchart illustrating the process of responding to a local transactional load instruction in accordance with an embodiment of the present invention. The system starts when a local transactional load instruction is received (step 302). Next, the system determines if there is an entry in the transaction buffer for the addressed location (step 304).

If not, the system allocates an entry for the load in the transaction buffer (step 306). Next, the system reads the data for the load from the cache (step 308) and stores the data in the local value field of the allocated entry in the transaction buffer (step 310). If there was already an entry in the transaction buffer at step 304 or after storing data in a new entry at step 310, the system returns to the processor the local value from the entry in the transaction buffer to complete the load instruction (step 312).

Local Transactional Store Instruction

Figure 4:
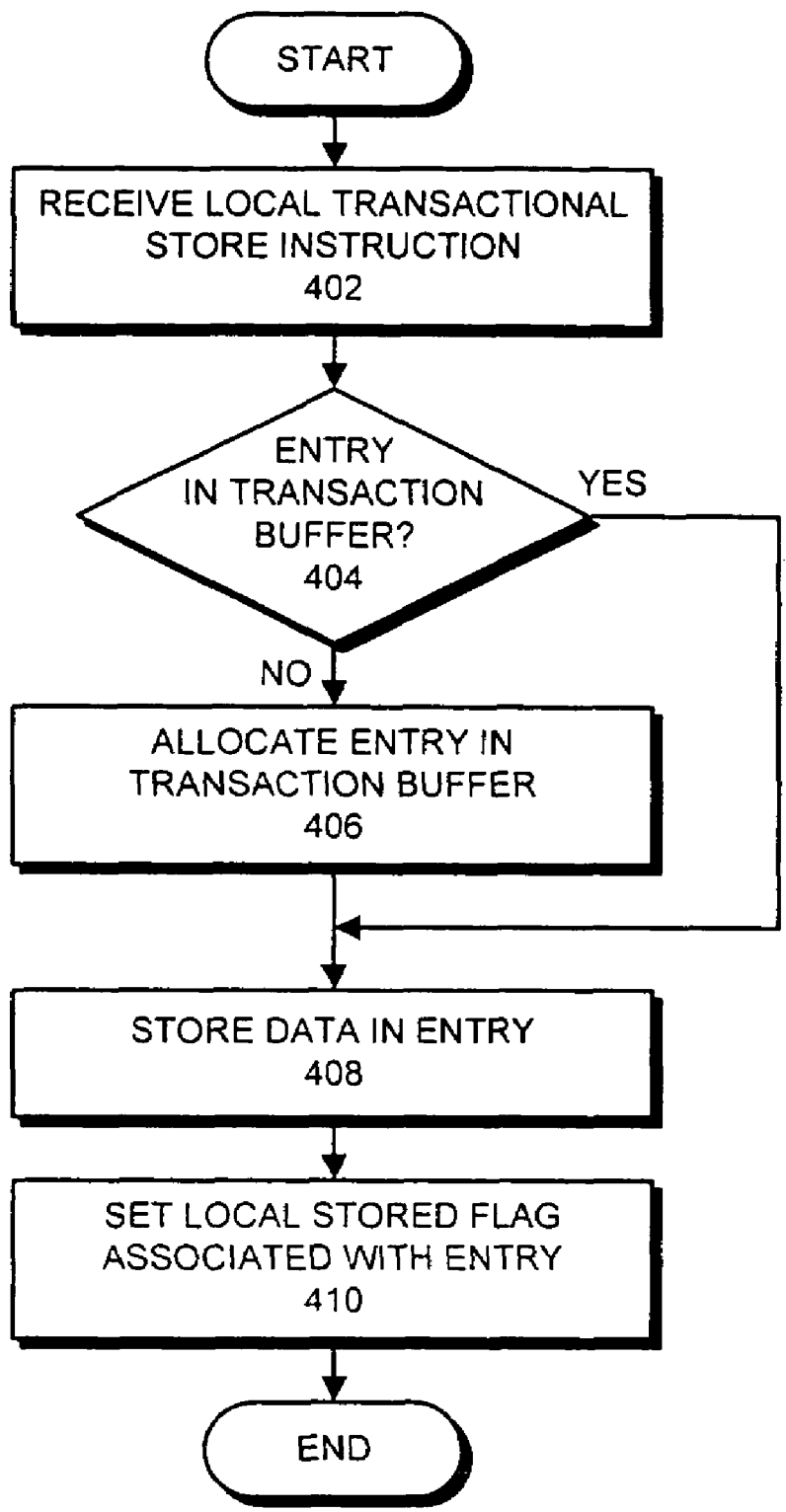
FIG. 4 presents a flowchart illustrating the process of responding to a local transactional store instruction in accordance with an embodiment of the present invention.

FIG. 4 presents a flowchart illustrating the process of responding to a local transactional store instruction in accordance with an embodiment of the present invention. The system starts when a local transactional store instruction is received (step 402). Next, the system determines if there is already an entry in the transaction buffer for the memory location addressed by the store instruction (step 404).

If not, the system allocates an entry in the transaction buffer (step 406). After an entry is allocated in the transaction buffer for the store, the system stores the data in the local value field of the entry (step 408). Finally, the system sets the local stored flag associated with the entry in the transaction buffer (step 410).

Remote Non-Transactional Load Instruction

Figure 5:
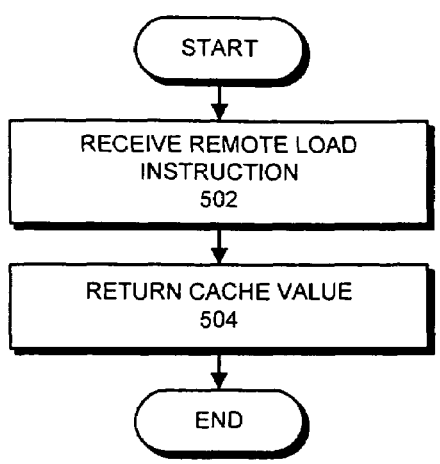
FIG. 5 presents a flowchart illustrating the process of responding to a remote non-transactional load instruction in accordance with an embodiment of the present invention.

FIG. 5 presents a flowchart illustrating the process of responding to a remote non-transactional load instruction in accordance with an embodiment of the present invention. The system starts when a remote non-transactional load instruction is received (step 502). In response, the system returns the cached value for the requested data (step 504). Note that this remote non-transactional load instruction does not interfere with the transaction.

Remote Non-Transactional Store Instruction

Figure 6:
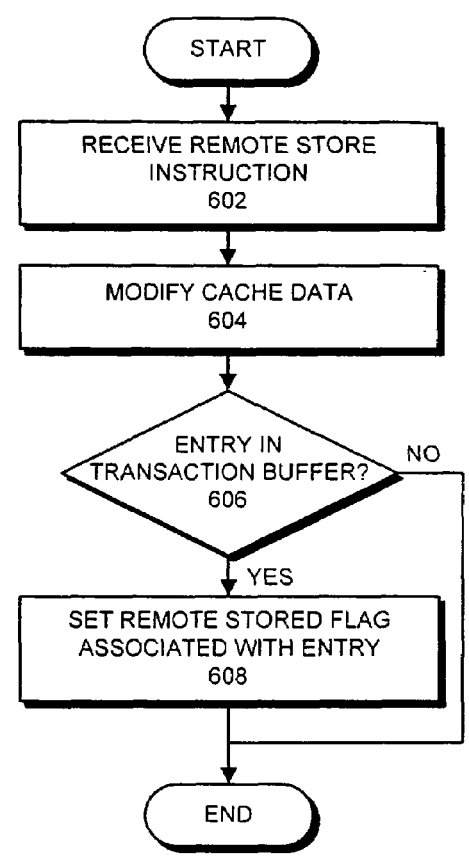
FIG. 6 presents a flowchart illustrating the process of responding to a remote non-transactional store instruction in accordance with an embodiment of the present invention.

FIG. 6 presents a flowchart illustrating the process of responding to a remote non-transactional store instruction in accordance with an embodiment of the present invention. The system starts when a remote non-transactional store instruction is received (step 602). In response, the system modifies the cache entry associated with the destination memory location of the store instruction (step 604). Note that unlike in a conventional transactional memory system, this remote non-transactional store instruction does not interfere with the transaction. In addition, the system determines if there is an entry in the transaction buffer for the destination memory location of the store instruction (step 606). If so, the system sets the remote stored flag of the entry (step 608).

Commit Instruction

Figure 7:
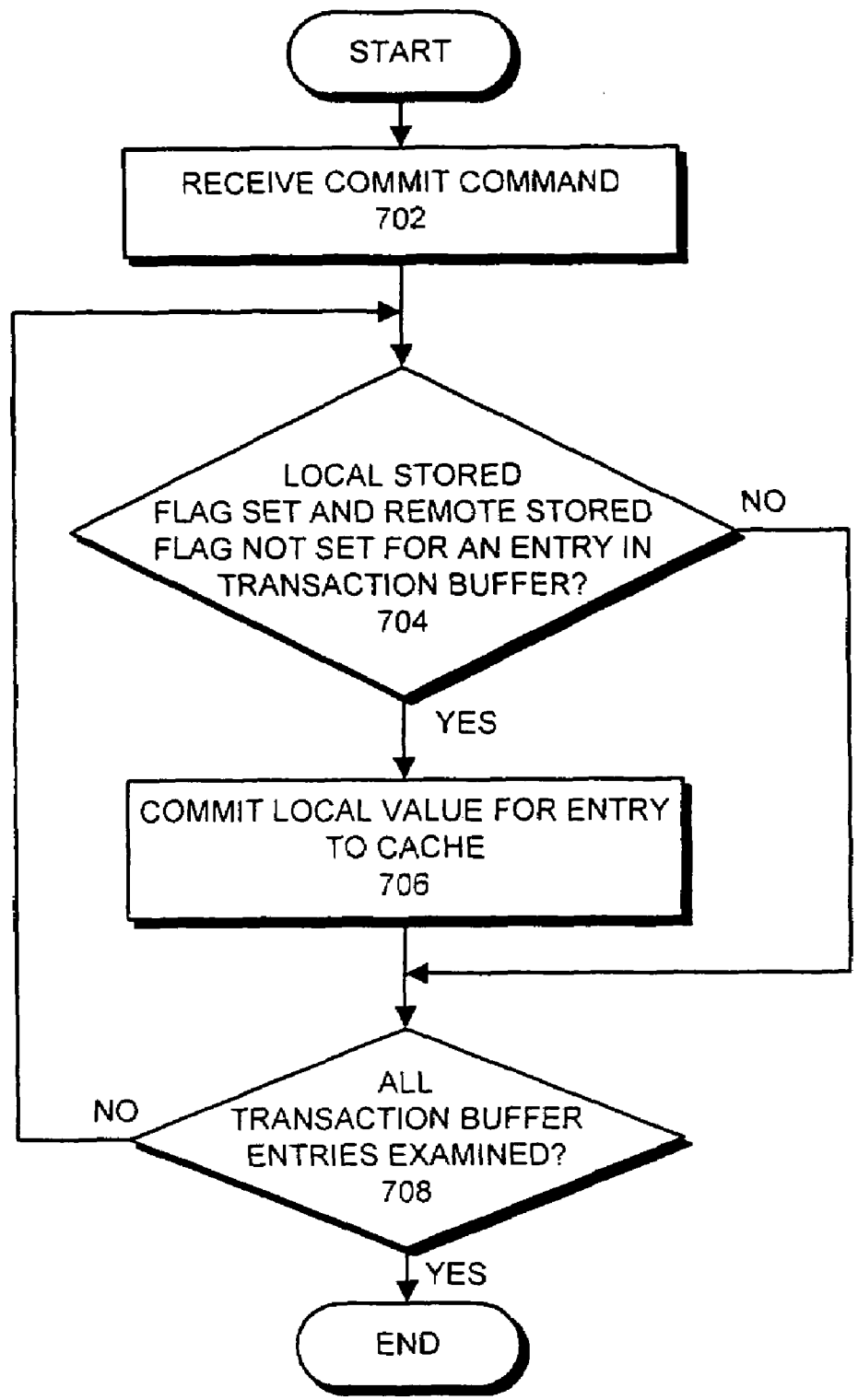
FIG. 7 presents a flowchart illustrating the process of responding to a commit instruction in accordance with an embodiment of the present invention.

FIG. 7 presents a flowchart illustrating the process of processing a commit instruction in accordance with an embodiment of the present invention. The system starts when a commit instruction is received for the transaction (step 702). In response, the system inspects the transaction buffer to determine if the local stored flag is set and the remote stored flag is not set for an entry in the transaction buffer (step 704). If so, the system commits the value in the entry to the cache (step 706).

After committing the value at step 706, or if the local stored flag is not set or the remote stored flag is set at step 704, the system determines if all transaction buffer entries have been examined (step 708). If not, the system returns to step 704 to inspect another entry in the transaction buffer. Otherwise, the process is complete.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to facilitate concurrent non-transactional operations in a transactional memory system, comprising:
   receiving a load instruction related to a local transaction;
   determining if an entry for the memory location addressed by the load instruction already exists in a transaction buffer;
   if so, returning the data from a data field in the entry in the transaction buffer to complete the load instruction;
   if not,
      allocating an entry for the memory location in the transaction buffer,
      reading data for the load instruction from a cache, and
      storing the data in the data field in the allocated entry in the transaction buffer; and
      returning the data to complete the load instruction;
   wherein if a remote non-transactional store instruction directed to the memory location is received during the local transaction, the remote non-transactional store proceeds and does not cause the local transaction to abort.

2. The method of claim 1, further comprising:
   receiving a store instruction related to the local transaction;
   determining if an entry for the memory location addressed by the store instruction is already located in the transaction buffer;
   if so,
      storing the data from the store instruction into the entry; and
      setting a local stored flag associated with the entry to indicate that the data was stored into the entry; and
   if not,
      allocating an entry in the transaction buffer for the memory location addressed by the store instruction;
      storing the data from the store instruction into the entry; and
      setting a local stored flag associated with the entry to indicate that the data was stored into the entry.

3. The method of claim 2, further comprising:
   receiving a commit instruction for the local transaction;
   determining if the local stored flag is set and the remote stored flag is not set for each entry in the transaction buffer;
   if so, committing the value in the transaction buffer entry to the cache for each entry where the local stored flag is set and the remote stored flag is not set; and
   otherwise, not committing the value in the transaction buffer entry to the cache.

4. The method of claim 1, further comprising:
   receiving a remote load instruction related to a remote operation; and
   returning data for the remote load instruction from the cache.

5. The method of claim 1, further comprising:
   receiving a remote store instruction related to a remote operation;
   storing data for the remote store instruction into the cache;
   determining if an entry for the memory location addressed by the store instruction is located in the transaction buffer; and
   if so, setting the remote stored flag for that entry.

6. The method of claim 1, wherein the local value in the transaction buffer is always a valid value as seen by the local transaction.

7. The method of claim 1, wherein:
   a concurrent remote load instruction is serialized before the local transaction, if no concurrent remote store to the same memory location has been serialized after the local transaction;
   a concurrent remote store is serialized after the local transaction; and
   a concurrent remote load instruction is serialized after a remote store instruction to the same memory location, if such a remote store instruction has been serialized after the local transaction.

8. A computer-readable storage medium storing instructions that when executed by a computer cause the computer to perform a method to facilitate concurrent non-transactional operations in a transactional memory system, the method comprising:
   receiving a load instruction related to a local transaction;
   determining if an entry for the memory location addressed by the load instruction already exists in a transaction buffer;
   if so, returning the data from a data field in the entry in the transaction buffer to complete the load instruction;
   if not,
      allocating an entry for the memory location in the transaction buffer,
      reading data for the load instruction from a cache, and
      storing the data in the data field in the allocated entry in the transaction buffer; and
      returning the data to complete the load instruction;
   wherein if a remote non-transactional store instruction directed to the memory location is received during the local transaction, the remote non-transactional store proceeds and does not cause the local transaction to abort.

9. The computer-readable storage medium of claim 8, the method further comprising:
   receiving a store instruction related to the local transaction;
   determining if an entry for memory location addressed by the store instruction is already located in the transaction buffer;
   if so, storing the data from the store instruction into the entry; and setting a local stored flag associated with the entry to indicate that the data was stored into the entry; and if not, allocating an entry in the transaction buffer for the memory location addressed by the store instruction;

storing the data from the store instruction into the entry; and setting a local stored flag associated with the entry to indicate that the data was stored into the entry.

10. The computer-readable storage medium of claim 9, the method further comprising:

receiving a commit instruction for the local transaction;

determining if the local stored flag is set and the remote stored flag is not set for each entry in the transaction buffer;

if so, committing the value in the transaction buffer entry to the cache for each entry where the local stored flag is set and the remote stored flag is not set; and otherwise, not committing the value in the transaction buffer entry to the cache.

11. The computer-readable storage medium of claim 8, the method further comprising:

receiving a remote load instruction related to a remote operation; and returning data for the remote load instruction from the cache.

12. The computer-readable storage medium of claim 8, the method further comprising:

receiving a remote store instruction related to a remote operation;

storing data for the remote store instruction into the cache;

determining if an entry for the memory location addressed by the store instruction is located in the transaction buffer; and if so, setting the remote stored flag for that entry.

13. The computer-readable storage medium of claim 8, wherein the local value in the transaction buffer is always a valid value as seen by the local transaction.

14. The computer-readable storage medium of claim 8, wherein:

a concurrent remote load instruction is serialized before the local transaction, if no concurrent remote store to the same memory location has been serialized after the local transaction;

a concurrent remote store is serialized after the local transaction; and a concurrent remote load instruction is serialized after a remote store instruction to the same memory location, if such a remote store instruction has been serialized after the local transaction.

15. A computer system that facilitates concurrent non-transactional operations in a transactional memory system, comprising: a processor; a memory controller; a receiving mechanism in the memory controller configured to receive a load instruction from the processor related to a local transaction; a determining mechanism configured to determine if an entry for the memory location addressed by the load instruction already exists in a transaction buffer; an allocating mechanism configured to allocate an entry for the memory location in the transaction buffer; a reading mechanism in the memory controller configured to read data for the load instruction from a cache; a storing mechanism configured to store the data in a data field in the allocated entry in the transaction buffer; and a data-returning mechanism in the memory controller configured to return the data to the processor to complete the load instruction; wherein if a remote non-transactional store instruction directed to the memory location is received by the receiving mechanism during the local transaction, the remote non-transactional store proceeds and does not cause the local transaction to abort.

16. The computer system of claim 15, wherein the receiving mechanism is further configured to receive a store instruction related to the local transaction;

wherein the determining mechanism is further configured to determine if an entry for the memory location addressed by the store instruction is already located in the transaction buffer;

wherein the allocating mechanism is further configured to allocate an entry in the transaction buffer for the memory location addressed by the store instruction;

wherein the storing mechanism is further configured to store the data from the store instruction into the entry; and wherein the apparatus further comprises a setting mechanism configured to set a local stored flag associated with the entry to indicate that the data was stored into the entry.

17. The computer system of claim 16, wherein the receiving mechanism is further configured to receive a commit instruction for the local transaction;

wherein the determining mechanism is further configured to determine if the local stored flag is set and the remote stored flag is not set for each entry in the transaction buffer; and wherein the apparatus further comprises a committing mechanism configured to commit the value in the transaction buffer entry to the cache for each entry where the local stored flag is set and the remote stored flag is not set.

18. The computer system of claim 15, wherein the receiving mechanism is further configured to receive a remote load instruction related to a remote operation; and wherein the data-returning mechanism is further configured to return data for the memory address related to the remote load instruction from the cache.

19. The computer system of claim 15, wherein the receiving mechanism is further configured to receive a remote store instruction related to a remote operation;

wherein the determining mechanism is further configured to determine if an entry for the memory location addressed by the store instruction is located in the transaction buffer; and further comprising a setting mechanism configured to set the remote stored flag for that entry.

20. The computer system of claim 15, wherein the local value in the transaction buffer is always a valid value as seen by the local transaction.

21. The computer system of claim 15, wherein:

a concurrent remote load instruction is serialized before the local transaction, if no concurrent remote store to the same memory location has been serialized after the local transaction;

a concurrent remote store is serialized after the local transaction; and a concurrent remote load instruction is serialized after a remote store instruction to the same memory location, if such a remote store instruction has been serialized after the local transaction.

* * * * *